(12) United States Patent
Jones

(10) Patent No.: US 8,060,448 B2
(45) Date of Patent: Nov. 15, 2011

(54) LATE BINDING TOKENS

(76) Inventor: Thomas C. Jones, Sammamish, WA (US)

( * ) Notice: Subject to any disclaimer, the term of this patent is extended or adjusted under 35 U.S.C. 154(b) by 1415 days.

(21) Appl. No.: 10/156,734

(22) Filed: May 28, 2002

(65) Prior Publication Data

US 2002/0184149 A1    Dec. 5, 2002

Related U.S. Application Data

(60) Provisional application No. 60/294,452, filed on May 30, 2001.

(51) Int. Cl.
*G06Q 20/00* (2006.01)
*G06F 15/16* (2006.01)

(52) U.S. Cl. ............... 705/65; 705/67; 705/75; 709/219

(58) Field of Classification Search .................... 705/64, 705/65, 66, 67, 75, 76, 50; 709/219
See application file for complete search history.

(56) References Cited

U.S. PATENT DOCUMENTS

| | | | |
|---|---|---|---|
| 5,590,197 A * | 12/1996 | Chen et al. | 705/65 |
| 5,781,723 A | 7/1998 | Yee et al. | |
| 5,850,442 A * | 12/1998 | Muftic | 705/65 |
| 5,943,423 A | 8/1999 | Muftic | |
| 6,005,942 A | 12/1999 | Chan et al. | |
| 6,038,551 A | 3/2000 | Barlow et al. | |
| 6,044,349 A * | 3/2000 | Tolopka et al. | 705/1 |
| 6,334,117 B1 * | 12/2001 | Covert et al. | 705/43 |
| 6,360,254 B1 * | 3/2002 | Linden et al. | 709/219 |
| 7,401,114 B1 * | 7/2008 | Block et al. | 709/203 |
| 7,478,434 B1 * | 1/2009 | Hinton et al. | 726/27 |
| 2002/0091646 A1 * | 7/2002 | Lake et al. | 705/67 |
| 2004/0215964 A1 * | 10/2004 | Barlow et al. | 713/172 |
| 2005/0246292 A1 * | 11/2005 | Sarcanin | 705/67 |

OTHER PUBLICATIONS

X9.59 Payment Card Process—7 pages, May 1, 2002, from www.garlic.com/~lynn.

* cited by examiner

*Primary Examiner* — Charles C Agwumezie
(74) *Attorney, Agent, or Firm* — Calfee, Halter & Griswold LLP

(57) ABSTRACT

A system for verifying intent in a card not present transaction is provided. The system includes a late binding token that is distributable to consumers without necessarily being bound to an account. The system also includes a client software that locates a token server configured to facilitate managing and communicating with the late binding token. The system also includes a protocol concerning how to build a verifiably secure structured proposal that carries an offer to the consumer through the client software.

21 Claims, 12 Drawing Sheets

LATE BINDING TOKENS

RELATED APPLICATION

This invention claims priority to U.S. Provisional Patent Application Ser. No.: 60/294,452, filed May 30, 2001.

TECHNICAL FIELD

The methods, systems, application programming interface (API), signals, and computer readable media described herein relate generally to computer programming, and more particularly to verifiably, securely, conducting card not present transactions.

BACKGROUND OF THE INVENTION

Consumers use credit cards, debit cards, and other cards to make purchases. Increasingly, consumers use these cards in electronic commerce conducted, for example, over the Internet. But conventional credit cards are not ideally suited for transactions where the card is not present at the merchant's site. Thus, "smart cards" or integrated circuit cards are growing in popularity.

An integrated circuit card (IC) has, for example, a processor, a data input/output port controlled by the processor to receive and output data, a random access memory (RAM), a read only memory (ROM), and a programmable data memory (e.g., EEPROM, FLASH). IC cards are available from various sources and in several configurations. IC cards can store information and thus can simplify electronic transactions. Confidential information like private keys can be maintained in a private storage area while non-confidential information, like a card identification number, can be stored in a public storage area. Thus, an electronic transaction may rely on both public and private data. The processor can be configured to access both the public and private storage areas. The private storage may only be accessible after the processor has verified a password (e.g., personal identification number (PIN)). Even though IC cards can simplify and improve electronic transactions, they can also introduce security and verifiability of intent problems into electronic transactions, especially "card not present" transactions.

Numerous patents describe various computerized systems for conducting electronic transactions in multiple different environments. For example, U.S. Pat. No. 6,038,551, filed Mar. 11, 1996 and issued Mar. 14, 2000, concerns a system supporting computer implemented applications that access and manage a multi-purpose integrated circuit card. The '551 patent even discloses employing public and private keys with a smart card. However, the '551 patent, and others like it, typically bind the smart card to accounts, applications, and so on at an early time in the life cycle of the card, which limits the use of this type of IC card.

U.S. Pat. No. 6,044,349, filed Jun. 19, 1998, and issued Mar. 28, 2000, describes a portable storage medium that stores data and provides access to information from an information dissemination system. The storage medium is a smart card (e.g., IC card) that stores information like a customer name, a customer address, and various customer account data. The '349 patent describes a smart card as a small electronic device containing a re-writable memory and additional integrated circuitry. These types of smart cards typically have data downloaded to the card (e.g., a debit amount) and have that downloaded data manipulated by various applications. These types of smart cards, while potentially more secure than cash, may not provide assurances adequate to carry out a card not present transaction across an insecure medium like the Internet.

Smart cards are well known in the art. For example, U.S. Pat. No. 6,005,942, filed Mar. 24, 1998, and issued Dec. 21, 1999, describes a system that allows smart card users to securely add applications to the card during the lifetime of the card after the card has been issued. The smart cards in the '942 patent are typically credit card sized plastic cards holding a semiconductor chip that can support multiple applications. The smart card interfaces with external devices (e.g., ATMs, computers, vending machines). The semiconductor chip embedded in the smart card facilitates performing computational operations like encryption and decision making. One example of a smart card implemented as a "processor card" is illustrated in Prior Art FIG. 1. It is to be appreciated that a smart card can be implemented in various ways and programmed with various functionalities. In some embodiments, smart card 10 has a microcontroller 20 that includes a microprocessor 30, RAM 40, ROM 50, non-volatile memory 60, a cryptographic module 70, and a card reader interface 80. Other standard features of a microcontroller like a clock, a random number generator, control logic and so on may be present but are not illustrated.

Microprocessor 30 can be any of various central processing units that execute commands and control the device. RAM 40 can store calculated results and perform other typical RAM functions. ROM 50 can store fixed data, standard routines, and other typical ROM memory items. Non-volatile memory 60 (e.g., electronically programmable ROM (EPROM)) stores persistent information that should be maintained even when the card is not connected to a power source. This information includes, but is not limited to, a card identification number, a personal identification number, and so on. Cryptographic module 70 is an example of an optional hardware module on typical smart cards that performs a variety of cryptographic algorithms. Card reader interface 80 includes hardware and software that facilitates the smart card communicating with devices external to the smart card. Thus, the internal architecture of a smart card is well known.

The '942 patent describes a smart card being initialized with data placed on the card before the card is issued to a card user. This data can include data common to a large number of cards and a minimal amount of card unique terms like a serial number and personalization keys. The '942 patent then describes overcoming a limitation of conventional smart cards through the ability to add applications to traditional smart cards. While adding an application to a smart card after issuance increases the usefulness of the smart card, it may not facilitate using the smart card in card not present transactions in a way that provides adequate assurances that an offer was presented correctly, accepted in a verifiable manner, and transmitted securely to the offer or and/or other third party verifiers.

Other patents, for example, U.S. Pat. No. 5,781,723, filed Jun. 3, 1996, and issued Jul. 14, 1998, concern a smart card storing information that facilitates the smart card identifying itself to other computing units. The '723 patent describes a smart card architecture that enables a smart card to identify its type and properties to computing units with which it communicates. This communication may involve interacting with a certificate authority. However, the '723 patent, like the other patents described herein, does not describe and/or suggest functionality in a smart card that facilitates producing a level of trust in a transaction adequate to support verifiably trustworthy card not present transactions.

Some patents have attempted to address security concerns in card not present transactions. For example, U.S. Pat. No. 5,590,197, filed Apr. 4, 1995, and issued Dec. 31, 1996, concerns an electronic payment system and method that stores sensitive account information and public/private key processing. In a conventional point of sale credit transaction, a consumer physically presents their credit card to a merchant. The merchant can then verify the authentication information (e.g., signature, photograph, fingerprint, card verification numbers). The merchant can also transmit card information to a credit card servicer for authorization. Thus, the security of the parties involved in the transaction (e.g., authorized card owner, merchant, credit card account company) depends on the merchant authenticating the card, the merchant protecting sensitive account information, the credit card servicer protecting sensitive information, and so on. In this conventional model, much sensitive information is transmitted across an insecure network like the Internet. Furthermore, in this conventional type of transaction, the consumer credit card was likely bound to a credit card account at the credit card servicer very early in the life cycle of the card. Thus, this conventional point of sale credit transaction includes significant risks for all parties involved in the transaction. These risks are exacerbated in a card not present transaction, like when a consumer purchases an item across the Internet from their home computer. The merchant cannot authenticate the card by comparing signatures or fingerprints, and an additional transmission of sensitive information is made from the consumer's computer to the merchant's computer. Financial institutions may be reluctant to accept risk of fraud loss in card not present transactions, so the merchant typically must bear greater risk.

Thus, although numerous patents and products have attempted to address problems associated with insecure card not present transactions, improvements can still be made.

SUMMARY OF THE INVENTION

The following presents a simplified summary of methods, systems, APIs, signals, and computer readable media for using late binding tokens in determining the intent of a party to an electronic transaction to facilitate providing a basic understanding of these items. This summary is not an extensive overview and is not intended to identify key or critical elements of the methods, systems, APIs, signals and computer readable media or to delineate the scope of these items. This summary provides a conceptual introduction in a simplified form as a prelude to the more detailed description that is presented later.

This application concerns systems and methods for a consumer to engage in a card not present transaction and to express their intentions to make a purchase in a manner that can be treated as a legally binding contract and/or the logical equivalent of a card present transaction. A card not present transaction can be, for example, a consumer making a purchase over the Internet.

The application also concerns late binding tokens that help a consumer maintain their privacy while making an assertion of acceptance of an offer from a merchant. The late binding tokens facilitate creating a system that can be relied on by the merchant, a value verifier, and the consumer, without requiring that the token be bound to the consumer, merchant, or value verifier before the token is distributed. The late binding tokens described herein can be, for example, a smart card that includes a processor that can perform digital signature, hashing, and/or encrypting functions. The smart card also stores a uniform resource locator (URL) that facilitates locating a token server from which client side software associated with the late binding token can be retrieved. The smart card can also store other information like a personal identification number (PIN). A smart card can also store a public and/or private key to facilitate public/private secure communications.

Certain illustrative example methods, systems, APIs, signals and computer readable media are described herein in connection with the following description and the annexed drawings. These examples are indicative, however, of but a few of the various ways in which the principles of the methods, systems, APIs, signals and computer readable media may be employed and thus are intended to be inclusive of equivalents. Other advantages and novel features may become apparent from the following detailed description when considered in conjunction with the drawings.

BRIEF DESCRIPTION OF THE DRAWINGS

Prior Art

DETAILED DESCRIPTION

Figure 1:
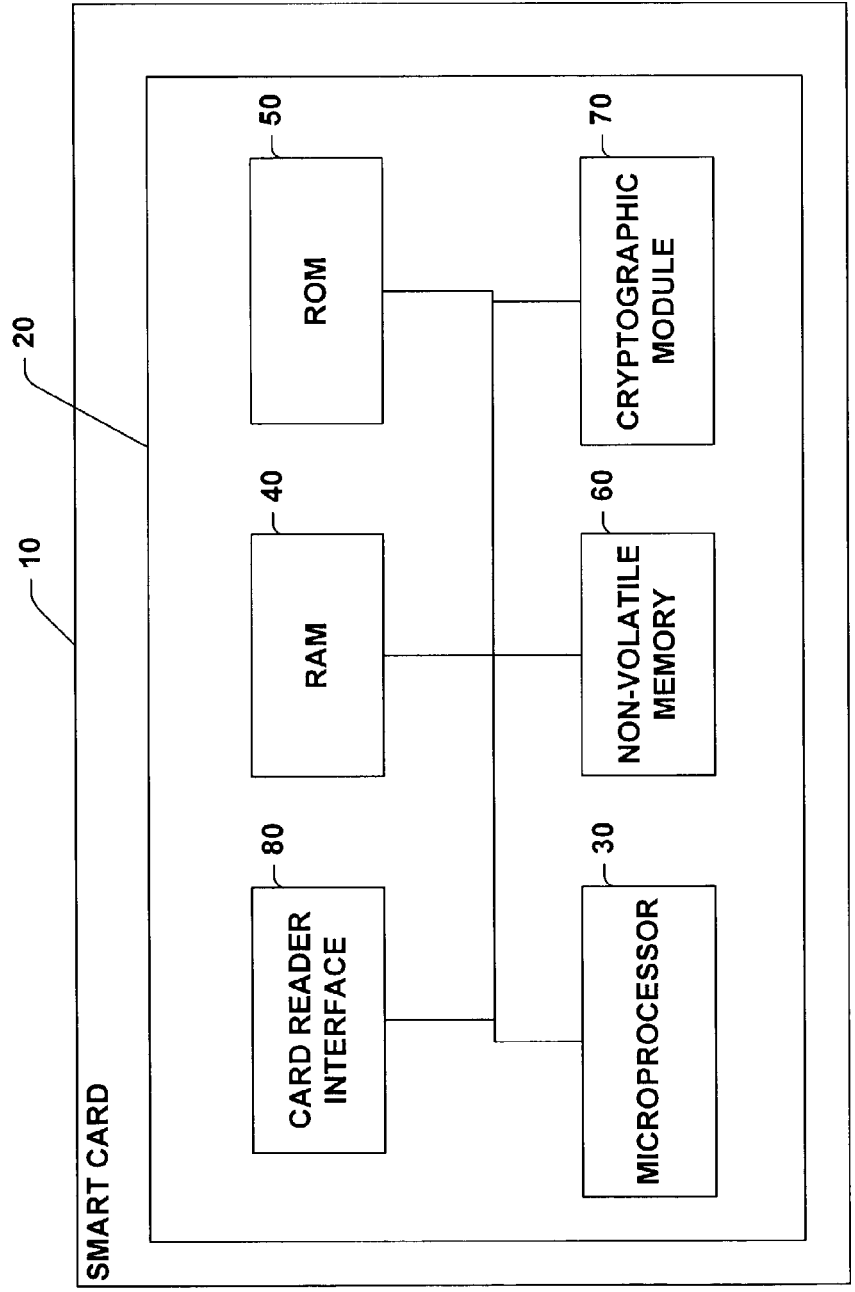
FIG. 1 illustrates an example smart card.

Example methods, systems, computer readable media, APIs, and signals are now described with reference to the drawings, where like reference numerals are used to refer to like elements throughout. In the following description, for purposes of explanation, numerous specific details are set forth in order to facilitate thoroughly understanding the methods, systems and computer readable media. It may be evident, however, that the methods, systems, computer readable media and so on can be practiced without these specific details. In other instances, well-known structures and devices are shown in block diagram form in order to simplify description.

The systems, methods, computer readable media, APIs, and signals described herein facilitate creating a chain of trust that will increase regulator and/or financial institution confidence that due diligence was performed in ascertaining and recording a consumer's intent with respect to a transaction. The systems and methods described herein facilitate replacing ISO X.509 certificate structures where a person's identity is bound to a card before the card is shipped. The X.509 model is employed where consumers order credit cards from companies where they already have an account or where the account will be set up on the application for the card.

An example late binding token system that facilitates increasing confidence in consumer acceptance of verifiably secure offers includes client code running on a consumer's computer arid a server specific to a particular token. The system includes late binding tokens that can be carried with the consumer to offer proof of the consumer's presence and to facilitate instilling confidence in the consumer's intention to enter into a transaction. The system also includes a protocol that specifies how to construct a verifiably secure offer. The server supplies logic (e.g., a plug in applet) for the client code that will perform further interchanges with the token. Tokens are issued with an explicit or implicit URL that facilitates locating a specific server that understands how the token operates and that can provide the client code with the logic for hashing a message and signing a message using logic contained on the late binding token. In this manner, the tokens act as a means for locating a server of a token issuer for providing logic that processes the message in the required manner (as described). When a token is linked to (e.g., inserted into) a computer running the consumer client code, late binding data will be read from the token. The late binding data can include, but is not limited to, the token's public key and/or other identifying information. The consumer client code retrieves a URL for a token server from the token and/or from another source. The token creates a secure enviromnent in which a hash of a message can be signed. Bindings between the token and an actual consumer and/or an actual financial account are contained on the token server. Thus, bindings can be added, deleted, and updated as the consumer desires without displaying personal information to third parties, like merchants. Thus, the token can be distributed to consumers with no prior agreement between the consumer and any server site with which the consumer will then interact.

A message from a merchant to a consumer is displayed to the consumer in a secure client code window. The window also displays items through which the consumer can provide indicia of acceptance (e.g., I accept button(s), PIN field). When the consumer indicates acceptance of the merchant's offer, the client code hashes the message that created the secure display and provides it to the token for signing. The hash is a mathematical combination of the data in the message and the indicia of acceptance. The hash is cryptographically secure from collision with a hash from any other message. The token signs the hash. After the token signs the hash, the signed hash, the unsigned hash and other identifiers (e.g., token identifier, client identifier) are bundled together by the client code and digitally signed by the client code. This second signature attests to the consumer having been presented the offer in a secure window and having assented to the offer.

As used in this application, the term "computer component" refers to a computer-related entity, either hardware, firmware, software, a combination thereof, or software in execution. For example, a computer component can be, but is not limited to being, a process running on a processor, a processor, an object, an executable, a thread of execution, a program and a computer. By way of illustration, both an application running on a server and the server can be computer components. One or more computer components can reside within a process and/or thread of execution and a computer component can be localized on one computer and/or distributed between two or more computers.

"Computer communications", as used herein, refers to a communication between two or more computers and can be, for example, a network transfer, a file transfer, an applet transfer, an email, a hypertext transfer protocol (HTTP) message, a datagram, an object transfer, a binary large object (BLOB) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, and so on.

"Signal", as used herein, includes but is not limited to one or more electrical or optical signals, analog or digital, one or more computer instructions, a bit or bit stream, or the like.

"Software", as used herein, includes but is not limited to, one or more computer readable and/or executable instructions that cause a computer or other electronic device to perform functions, actions and/or behave in a desired manner. The instructions may be embodied in various forms like routines, algorithms, modules, methods, threads, and/or programs. Software may also be implemented in a variety of executable and/or loadable forms including, but not limited to, a stand-alone program, a function call (local and/or remote), a servelet, an applet, instructions stored in a memory, part of an operating system or browser, and the like. It is to be appreciated that the computer readable and/or executable instructions can be located in one computer component and/or distributed between two or more communicating, co-operating, and/or parallel processing computer components and thus can be loaded and/or executed in serial, parallel, massively parallel and other manners.

"Purchase", as used herein, includes but is not limited to contracts for a consumer to accept goods or services from a merchant, or other consumer contracts that commit the consumer to financial transactions, for example, paying taxes, moving funds between accounts, or transactions in stocks, bonds, or related securities.

"Merchant", as used herein, includes but is not limited to vendors of goods and services as well as governmental bodies, or financial institutions, including securities brokers, banks, and insurance companies.

"Funds", as used herein, refers to consideration given by a consumer to a merchant in exchange for goods or services delivered. Funds include, but are not limited to, money on account of the consumer at a financial institution, credit given to the consumer by a financial institution, frequent flyer miles, or frequent buyer credits held on account of the consumer.

"Token", as used herein, refers to a logic together with the means to execute that logic that is held by a consumer. Tokens include, but are not limited to, smart cards with an embedded microprocessor, special logic supplied within a consumer's computer, or a general purpose computer with a logic run by the consumer.

"Logic", as used herein, includes but is not limited to hardware, firmware, software and/or combinations of each to perform a function(s) or an action(s). For example, based on a desired application or needs, logic may include a software controlled microprocessor, discrete logic such as an application specific integrated circuit (ASIC), or other programmed logic device. Logic may also be fully embodied as software.

A "hash" is a number generated from a string of text. A hash is substantially smaller than the hashed message and is generated by a formula that makes it unlikely that other messages will produce the same hash. A hash is used in a secure system to facilitate producing a numeric value of a fixed length that uniquely identifies data. Hashes are used with digital signatures to provide additional security in a memory efficient manner since hashes represent a large amount of data as a smaller numeric value. Thus, a process can efficiently sign a hash instead of signing the larger data set from which the hash was produced. In a hash and digital signature transaction, a sender may generate a hash, encrypt it, and send it with a digital signature to a receiver. The receiver decrypts the hash and the message, regenerates the hash from the message, and compares the received hash with the generated hash. If they match, it is unlikely that the message was corrupted or altered after it was hashed and signed.

Public/private key cryptography uses two keys to facilitate secure communications. A first party distributes its public key to entities to which it expects to send secure communications. When the first party that possesses the private key desires to transmit a secure message to the second party, the first party hashes and signs the message using the private key. Upon receipt of the message, the second party decrypts the signed hash of the secured message with the first party's public key, which should be the only key that will verify messages signed with the private key. Similarly, when the second party wants to transmit a secure message to the first party, the second party hashes and signs the message with the private key of the second party and transmits it.

Prior Art FIG. 1 illustrates an example smart card 10. While the smart card 10 includes several components (e.g., RAM 40, ROM 50), it is to be appreciated that smart cards employable by the systems and methods described herein can include a greater or less number of computer components. Preferably, the smart cards employed with the systems and methods described herein are very "thin". Minimally, the smart cards include processing logic for hashing and/or signing a hash of a structured proposal and consumer indicia of acceptance of the proposal. Furthermore, smart card 10 includes means to communicate with external devices. These means include, but are not limited to, a contact based port, a radio frequency based communication port, and an optical based communication port. Smart card 10 includes a memory that will hold a URL of a token server that stores software that facilitates interactions with the smart card. The memory further stores one or more public/private key pairs to facilitate secure communications. It is to be appreciated that smart card 10 does not need to be initially "bound" to any consumer and/or accounts when the card is provided to a consumer.

Figure 2:
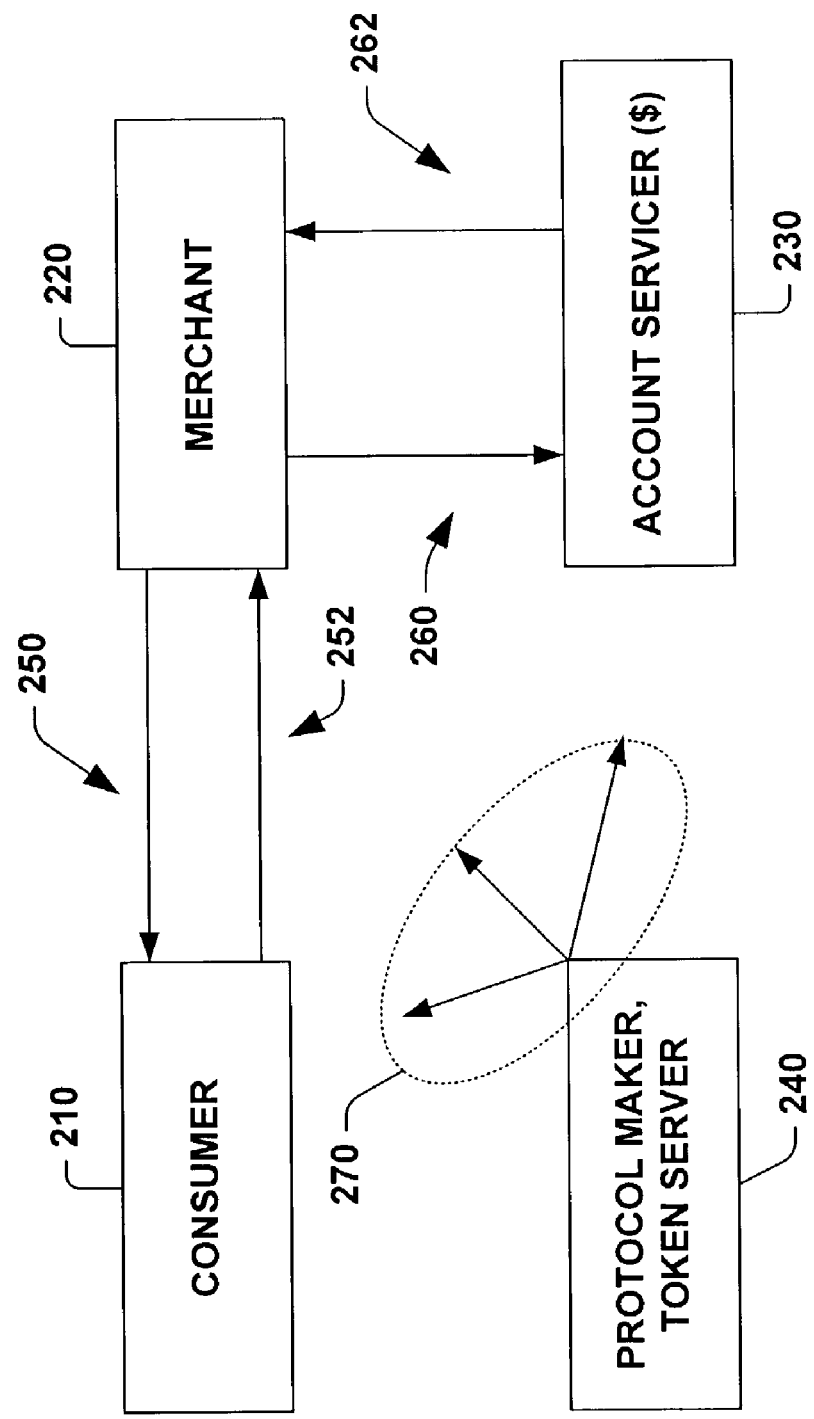
FIG. 2 illustrates one logical flow of information through an example system for card not present transactions.

FIG. 2 illustrates one logical flow of information through a system 200 that supports card not present transactions. In system 200, a consumer 210 interacts with a merchant 220 that in turn interacts with an account servicer 230. The consumer 210 may be a human and/or automated process. The system 200 seeks to protect the consumer 210 by minimizing the amount of sensitive information transmitted through the system 200. The system 200 also seeks to protect the merchant 220 by increasing certainty that the merchant 220 is interacting with a real consumer 210 (e.g., not an imposter), and that the consumer 210 has adequate funds to enter into a transaction. The system 200 further seeks to protect the merchant 220 by raising confidence that the consumer acceptance of an offer, and an attestation indicating the acceptance, are secure. The account servicer 230 is responsible for determining whether a consumer 210 has sufficient funds or credits for a transaction into which they wish to enter with the merchant 220.

A protocol maker/token server 240 facilitates providing attestations to one or more of the consumer 210, merchant 220, and account servicer 230 that the consumer 210 is the actual account owner associated with a token, that an offer received by the consumer 210 has been unaltered since accepted and signed by the consumer 210, and that the consumer 210 has adequate funds. Thus, the protocol maker/token server 240 facilitates encouraging on-line, "card not present" transactions. The protocol maker/token server 240 encourages these transactions by making attestations 270 to the other parties that the transaction was accurate, secure, and financially feasible.

In system 200, a merchant 220 produces an offer 250 that is presented to the consumer 210. The consumer 210 can indicate their acceptance of the offer 250 through an acceptance 252 that is returned to the merchant 220. This coupling requires the transmission of certain sensitive information between the consumer 210 and the merchant 220 and thus is suboptimal. Once the merchant 220 receives the acceptance 252, the merchant 220 may make a funds query 260 to the account servicer 230. The account servicer 230 can then reply with a funds verification 262 concerning the query 260. Again, sensitive information may be transmitted between the merchant 220 and the account servicer 230, which is suboptimal. To address these suboptimalities, FIG. 3 provides an alternate logical flow of information through a system that supports card not present transactions.

Figure 3:
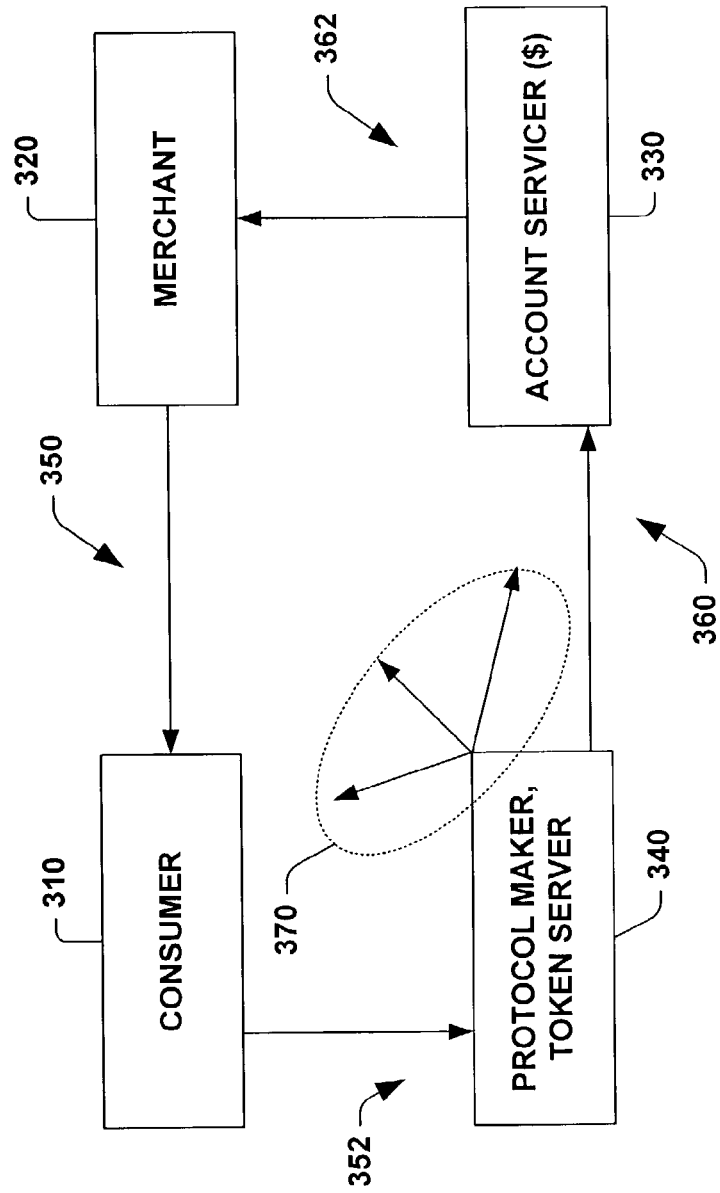
FIG. 3 illustrates another logical flow of information through an example system for card not present transactions.

FIG. 3 illustrates another logical flow of information through an example system 300 for card not present transactions. In system 300, a consumer 310 interacts with a merchant 320, an account servicer 330, and a protocol maker/token server 340. The protocol maker/token server 340 provides attestations 370 to the other parties that the logical flow of information will lead to a verifiably secure transaction.

In the system 300, the merchant 320 produces a structured proposal in accordance with a protocol provided by the protocol maker 340. The structured proposal is transmitted at 350 to the consumer 310. In this manner, the system 300 contains a means for defining (340), constructing and using structured proposals. The consumer 310, interacting with client side software and a late binding token, receives the structured proposal in a secure window, and if they accept, provide indicia of their acceptance of the offer. These indicia can include, but are not limited to, pressing an "I agree" button one or more times, providing a personal identification number (PIN), and so on. Rather than returning information to the merchant 320, the consumer 310, a late binding token, and/or a client side software provide, at 352, a twice signed bundle to the token server 340. The token server 340 holds the binding between the consumer 310, the late binding token, and for example, accounts associated with the consumer and/or the token. The token server 340 is programmed to facilitate verifying the security and accuracy of the twice signed bundle transmitted to the token server 340 at 352. While the protocol maker and token server 340 are illustrated as a single block in FIG. 3, it is to be appreciated that the protocol maker and the token server may be separate entities. In one example, the token server 340 is programmed to facilitate performing funds verification. Thus, at 360, a request concerning the sufficiency of funds for the transaction related with transmission 352 is made to account servicer 330. If there are sufficient funds, then at 362, the account servicer 330 may provide an authorization code to the merchant 320. Note that in this logical flow, less sensitive information is transmitted through the system 300. Thus, problems associated with card not present transactions may be mitigated by a system like that described in FIG. 3.

Figure 4:
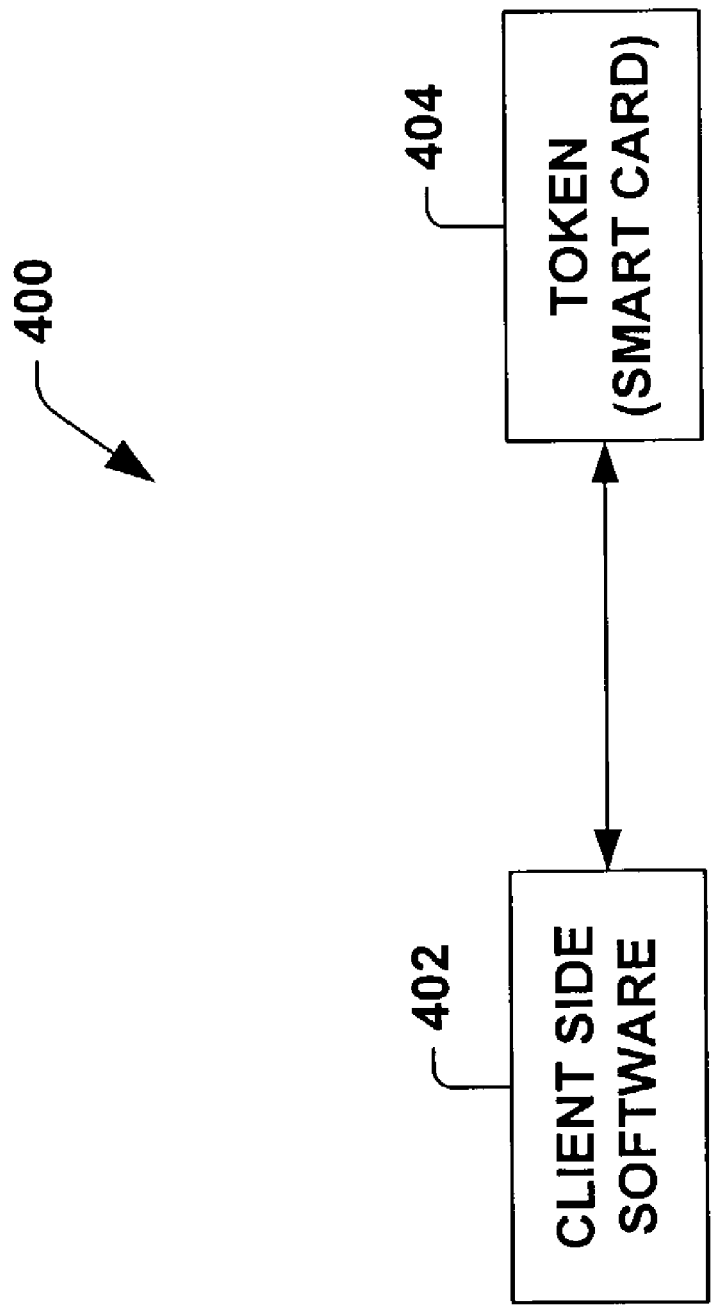
FIG. 4 illustrates a portion of an example late binding token system.

FIG. 4 illustrates a portion of an example late binding token system. The system 400 includes a client side software 402 and a late binding token 404. The client software 402 facilitates communicating with items including, but not limited to, the late binding token 404, a merchant application, a token server, a consumer, a verifier, and so on. The token 404 is initially unbound to consumers, accounts, and so on, but can be bound to such items after receipt by the consumer. In this manner, the system 400 acts as a means for communicating with the token server to provide late binding of a token to a consumer, account, etc.

The token 404 can, in one example, include a logic for communicating with the client side software 402. Such communications may occur by, for example, computer communications. The token 404 can also include a logic for digitally signing items provided to the token 404 by the client side software 402. These items can include, but are not limited to, hashes, files, fields, records, messages, and so on. Furthermore, the token 404 can include a memory that stores items including, but not limited to, the URL of a token server programmed to facilitate interactions with the token 404 and/or the client side software 402, and a public/private key pair to facilitate secure communications with the token 404.

The client side software 402 can include logic for receiving a token server communication logic. Token server communication logic facilitates subsequent communications between a token server and the token 404 and/or the client side software 402. The client side software 402 also includes a logic for receiving a structured proposal to present to a consumer. The client side software 402 receives a structured proposal, presents it to a consumer in a secure window, and then detects indicia of acceptance or rejection of the offer. Thus, the client side software 402 includes a logic for recognizing an indicia of consumer acceptance of an offer in the structured proposal that it received and displayed.

If the client side software 402 detects that the consumer has accepted the offer presented in the secure window, then the client side software 402 can, in one example, hash the structured proposal and the indicia of the consumer acceptance into an unsigned hash to transmit to the token 404. Thus, the client side software 402 includes logic for performing such a function and furthermore acts as a means for hashing a data packet including the structured proposal and an indicia of the intent of the consumer in the structured proposal, and for providing the hashed data packet to the late binding token. The client side software 402 also includes logic to receive a hash signed by the token 404. The client side software 402 also includes logic that facilitates bundling of the unsigned hash that was sent to the token 404, the indicia of consumer acceptance that were sent to the token 404, a signed hash returned from the token 404, and various identifiers including, but not limited to, a client software identifier and a token 404 identifier. The client side software 402 also includes logic for digitally signing the bundle created by the previously described logics.

Figure 5:
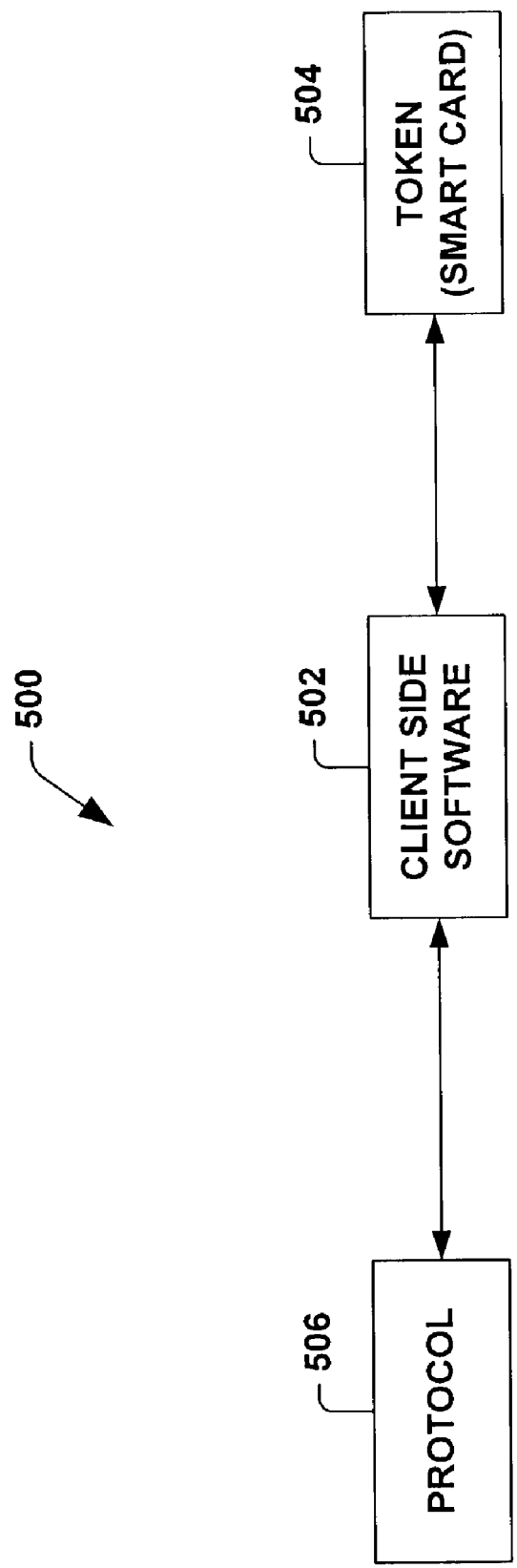
FIG. 5 illustrates a portion of an example late binding token system.

FIG. 5 illustrates a portion of an example late binding token system 500. A goal of system 500 is to ensure that sufficient care has been exercised to assure only authorized transactions occur. A merchant produces a structured proposal in accordance with a protocol 506 established by a protocol definer. In one example, the protocol definer may be a standards body document, for example, ANSI DSTU X9.59. The merchant requires assurance that the structured proposal is presented to a consumer in a secure window in a verifiably secure way. The merchant also requires assurance that the consumer accepted the offer using indicia of acceptance that satisfy relevant regulatory agencies and/or personnel. Thus, in system 500, the structured proposal protocol 506 is referenced when creating a structured proposal that is presented to the client side software 502. The client side software 502 presents an offer coded in the structured proposal to a consumer. The client side software 502 then employs the token 504 to sign a hash produced by the client side software 502. The structured proposal protocol 506 can specify parameters like the format of a structured proposal, the content of a structured proposal, the size of a structured proposal, fields required in a structured proposal, an encryption technique for encrypting a structured proposal, a structured proposal schema, and so on. In one example, the structured proposal protocol 506 can be implemented in software, and function as a structured proposal generator that compiles a merchant offer into a structured proposal suitable for transmission to the client side software 502. In one example, a structured proposal formatted in accordance with the structured proposal protocol 506 includes a digital merchant trademark. This digital merchant trademark facilitates increasing the level of confidence in a consumer that an offer presented to the consumer by the client side software 502 is a legitimate offer.

Figure 6:
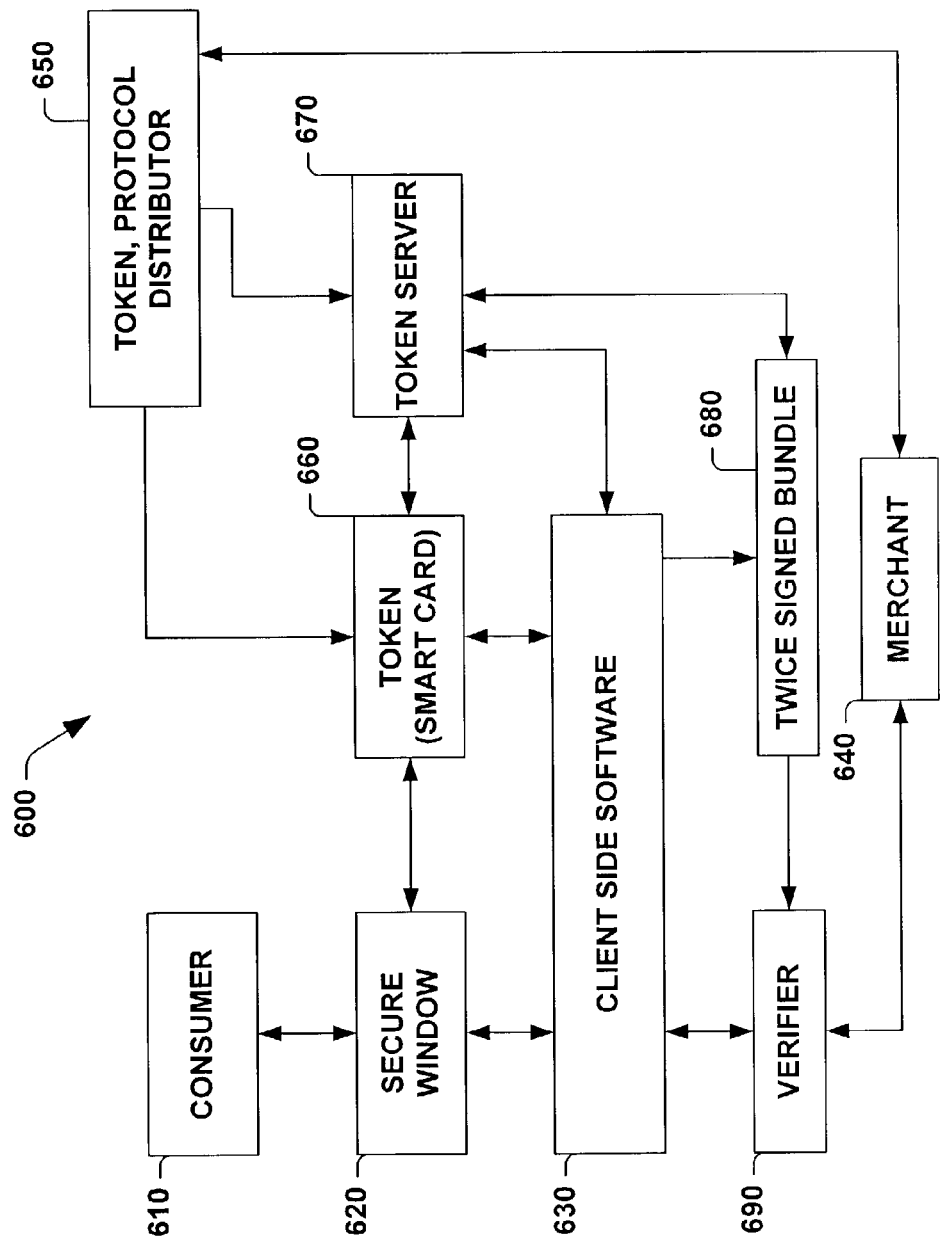
FIG. 6 illustrates an example system for secure transactions that includes late binding tokens.

FIG. 6 illustrates an example system 600 for secure transactions that include late binding tokens. In system 600, a consumer 610 interacts with a client side software 630 through a secure window 620 produced by the client side software 630. The client side software 630 also interacts with a token 660. The token 660 is a late binding token that may have been distributed by a token distributor 650. The token distributor 650 may also be a protocol distributor 650 that distributes a structured proposal protocol to, for example, a merchant 640. While the token and protocol distributor are illustrated in the same block in FIG. 6, it is to be appreciated that the token and protocol distributors may be different parties.

The system 600 includes a token server 670 that facilitates managing late binding operations and other operations associated with the late binding token 660. These operations can include, but are not limited to, communicating with the token 660, verifying the token 660, configuring the token 660, providing communication software that facilitates communicating with the token 660, disabling the token 660, and so on. In one example, the system 600 includes a token server 670 that stores token server communication logics programmed to facilitate communication with various late binding tokens 660. For example, a first token 660 may require a first communication logic to facilitate communicating with the token server 670 in a first manner while a second type of token 660 may require a second type of software to communicate with the same or some other token server 670 as determined by information from the token. In one example, the software provided from the token server 670 to the client side software 630 is an applet. The token server 670 includes logic for selectively transmitting token server communication logics to the client side software 630 in response to a download request from the client side software 630. For example, a consumer 610 may receive a token 660 and install software associated with the token 660, where the software interacts with the client side software 630. The client side software 630 may then make a request to the token server 670 for an applet to facilitate subsequent communications between the client side software 630 and the token 660.

The client side software 630 can receive indicia of consumer 610 acceptance of an offer displayed in the secure window 620. Thus, the client side software 630 may provide data (e.g., unsigned hash, indicia of acceptance), to the token 660 for digital signing. Upon receipt of a signed item from the token 660, the client side software 630 can produce a twice signed bundle 680. The twice signed bundle 680 can include items like an unsigned hash, a signed hash, indicia of consumer acceptance of an offer, and identifiers associated with the token 660 and/or client side software 630. Therefore, the client side software 630 is a means for providing a second digital signature of a bundle data packet including the unsigned hashed data packet of the structured proposal and an indicia of the intent of the consumer entered into the secure window 620, and the hashed data packet that was signed by the token 660. Thus, the token server 670 can include a logic for receiving the twice signed bundle 680 and for establishing a security assurance level of the twice signed bundle 680.

In one example system 600, a verifier 690 may be included to facilitate determining a security assurance level of a digitally signed bundle. In addition to determining a security assurance level of a digitally signed bundle 680, the verifier 690 may additionally and/or alternatively determine whether a consumer has sufficient funds to complete a transaction associated with the twice signed bundle 680.

It is to be appreciated that consumer executable components of the system 600 can be stored on a computer readable medium.

Figure 7:
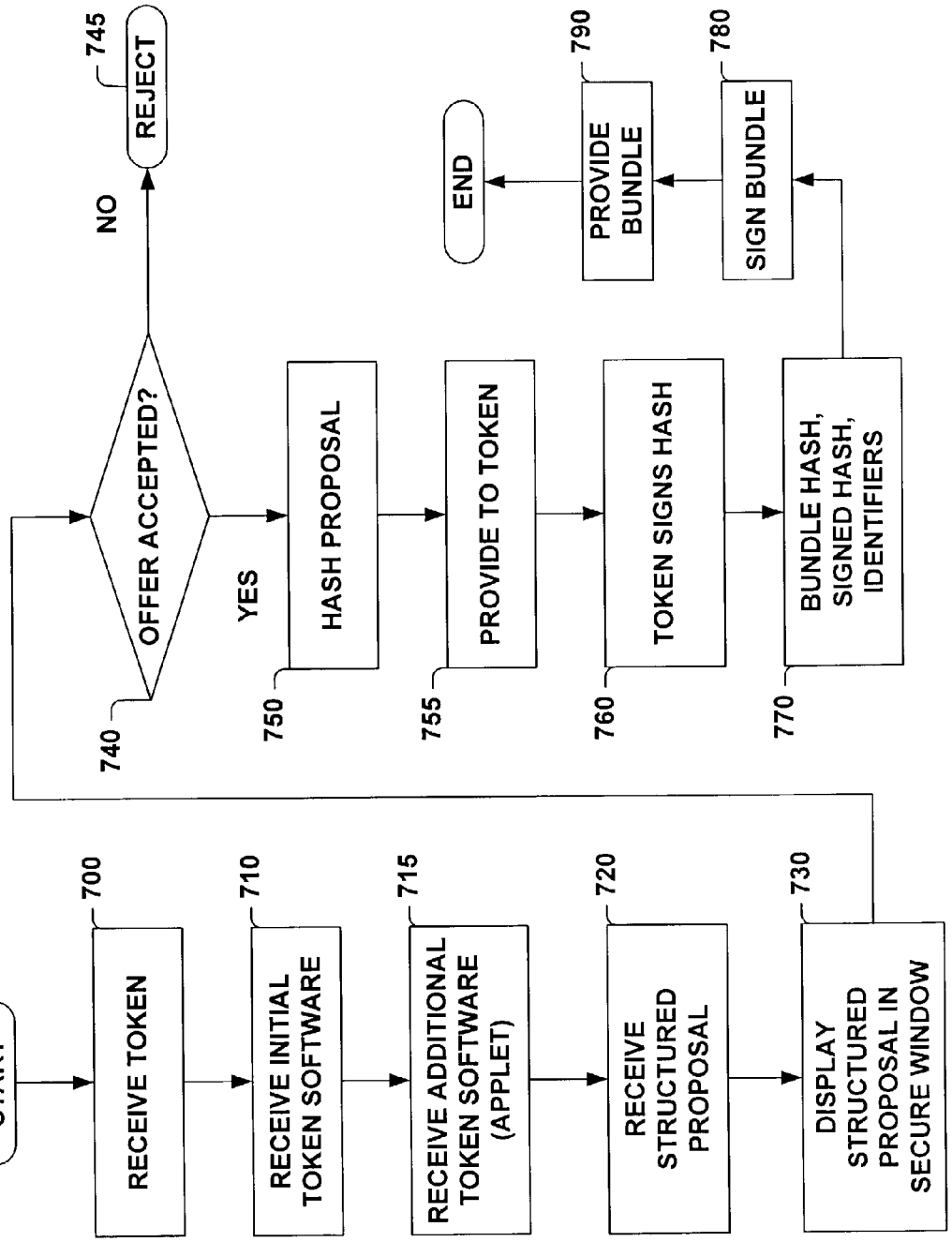
FIG. 7 is a flow chart of an example client side method for secure transactions employing late binding tokens.
Figure 8:
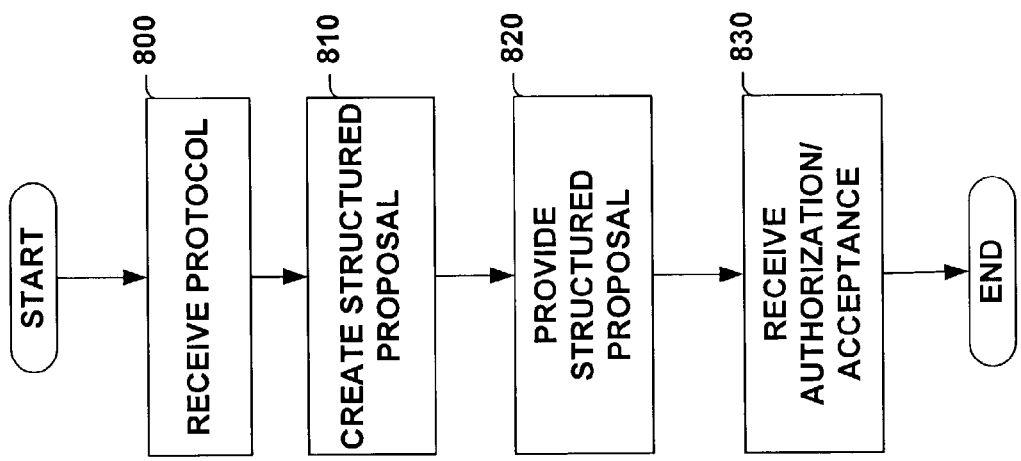
FIG. 8 is a flow chart of an example merchant side method for secure transactions that employs late binding tokens.
Figure 9:
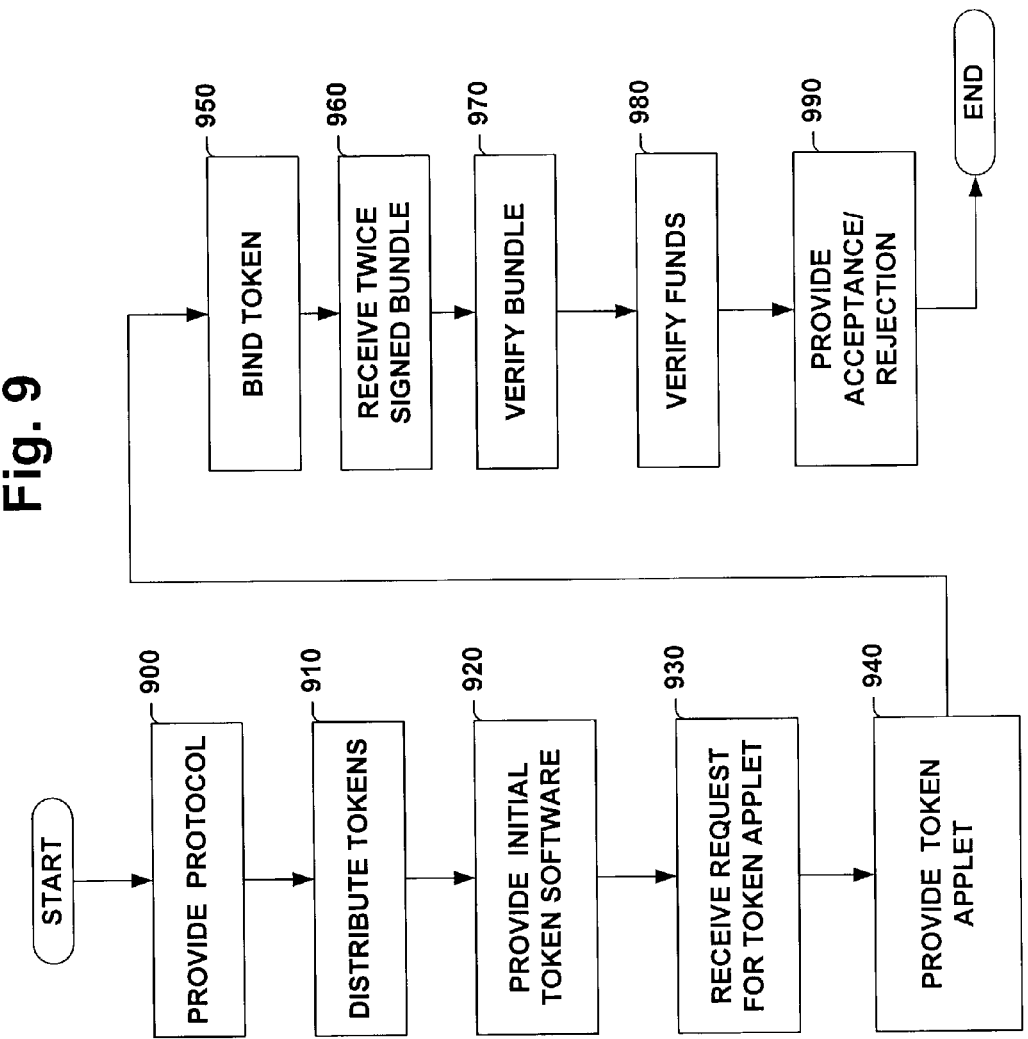
FIG. 9 is a flow chart of an example token/protocol distributor method for secure transactions that employ late binding tokens.

In view of the exemplary systems shown and described herein, example methodologies that are implemented will be better appreciated with reference to the flow diagrams of FIGS. 7 through 9. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Furthermore, additional and/or alternative methodologies can employ additional, not illustrated blocks. In one example, methodologies are implemented as computer executable instructions and/or operations, stored on computer readable media including, but not limited to an application specific integrated circuit (ASIC), a compact disc (CD), a digital versatile disk (DVD), a random access memory (RAM), a read only memory (ROM), a programmable read only memory (PROM), an electronically erasable programmable read only memory (EEPROM), a disk, a carrier wave, and a memory stick.

In the flow diagrams, rectangular blocks denote "processing blocks" that may be implemented, for example, in software. Similarly, the diamond shaped blocks denote "decision blocks" or "flow control blocks" that may also be implemented, for example, in software. Alternatively, and/or additionally, the processing and decision blocks can be implemented in functionally equivalent circuits like a digital signal processor (DSP), an application specific integrated circuit (ASIC), and the like.

A flow diagram does not depict syntax for any particular programming language, methodology, or style (e.g., procedural, object-oriented). Rather, a flow diagram illustrates functional information one skilled in the art may employ to program software, design circuits, and so on. It is to be appreciated that in some examples, program elements like temporary variables, routine loops, and so on are not shown.

FIG. 7 is a flow chart that illustrates an example client side method for secure transactions that employ late binding tokens. Thus, the method facilitates securely indicating verifiable consumer intent to enter into a transaction. At 700, a token is received. The token is a late binding token with or without pre-established bindings. At 710, a first software associated with the late binding token received at 710 is received. This software facilitates locating, for example, a token server associated with the late binding token. The token server may be located, for example, through a URL stored in the unbound late binding token received at 700. Therefore, the first software and/or URL act as a means for locating a server of an issuer. At 715, additional token software is received from the token server. This software may be received in response to a download request from the entity receiving the token and the initial token software. The second software received at 715 facilitates interacting with the late binding token. Note that additional bindings to the token can occur at times including, but not limited to, the first use of the token and later points in the life of the token. In one example, the transactions into which a consumer who received the token and the software will enter are card not present transactions (e.g., electronic commerce via the Internet).

At 720, a structured proposal that includes an offer to enter into a transaction is received. In one example, the structured proposal will include a digital merchant trademark that facilitates increasing consumer confidence that the offer is legitimate. At 730, the offer contained in the structured proposal is displayed to a consumer in a secure window. The secure window, which acts as a means for securely displaying a structured proposal to a consumer and creating the indicia of acceptance, may appear on devices including, but not limited to, a consumer personal computer, a consumer cellular telephone, a consumer personal digital assistant (PDA), and so on. While FIG. 7 describes displaying the offer contained in the structured proposal in a secure window, it is to be appreciated that other communication techniques including, but not limited to, audio and haptic techniques can be employed in accordance with aspects of this application.

At 740, a determination is made concerning whether the offer displayed at 730 has been accepted. If the offer is rejected, then at 745 a rejection can be provided. If, however, the determination at 740 is that the consumer has accepted the offer, then at 750, the structured proposal that contained the offer can be hashed. At 755, the hashed proposal can be provided to the late binding token received at 700. At 760, the token can affix a digital signature to the hash and return it to the entity providing the hash to the token. Therefore, the token acts as a means for digitally signing the hashed data packet, which signed data packet may then be returned to the providing entity.

In one example, in a non-illustrated block, the token can be bound to one or more items. These items can include, but are not limited to, an individual, a credit account, a debit account, a merchant account, a frequent flyer account, a prepaid account, and so on. The bindings between items can be stored on, for example, a token server which facilitates minimizing the amount of sensitive data transmitted during a transaction employing the token.

At 770, the unsigned hash, the signed hash, and one or more identifiers (e.g., token identifier, software identifier, consumer identifier), are bundled together. This bundling can produce one or more files, records, fields, messages, and so on suitable for transmission via a computer communication. At 780, the bundle is digitally signed. Note that this is a second digital signature associated with the bundle. The first digital signature is provided by a token, the second digital signature is provided by the method illustrated in FIG. 7. This digital signature may be provided, for example, by client side software. These two digital signatures facilitate increasing confidence that the transaction was accurately displayed, intentionally accepted, and accurately transmitted to a transaction verifier. While two digital signatures are indicated in FIG. 7, it is to be appreciated that other arrangements of digital signatures and hashes can be employed in accordance with the method.

At 790, the bundle is provided to, for example, a transaction verifier and/or a funds verifier. It is to be appreciated that computer executable aspects of the method illustrated in FIG. 7 can be implemented in computer executable instructions and stored on a computer readable medium. Furthermore, it is to be appreciated that such computer executable instructions can be performed by client side software and/or token based logic.

FIG. 8 is a flow chart of an example merchant side method for secure transactions that employs late binding tokens. At 800, a structured proposal protocol is received by, for example, a merchant. The structured proposal protocol facilitates creating proposals that store offers that can be transmitted to a consumer in a manner that facilitates increasing consumer confidence that the offer is legitimate. In one example, the structured proposal protocol includes parameters for attaching a digital trademark to an offer produced by a merchant. At 810, employing the parameters specified in the structured proposal received at 800, a structured proposal is created. The structured proposal includes an offer to enter into an electronic transaction. At 820, the structured proposal is provided to, for example, a consumer. It is to be appreciated that the consumer can be a human and/or an automated process. For example, the offer may be presented to a human at their personal computer at home and may concern purchasing tickets to a baseball game. Similarly, the offer may be presented to an automated process monitoring stock market prices and may constitute an offer to purchase one or more items.

At 830, one or more items that comprise a response to the structured proposal provided at 820 are received. These responses can include, but are not limited to, an authorized acceptance of the offer, a rejection of the offer, and an unauthorized acceptance of the offer. By way of illustration, an authorized acceptance of the offer may indicate both that a verifier is sufficiently satisfied that the transaction occurred between legitimate parties in a legitimate manner, that the purchaser has sufficient funds, and that the offer or has sufficient goods for the transaction. An unauthorized acceptance of the offer may indicate that although a verifier is certain that the offer and acceptance were made in verifiably secure manners that the consumer may or may not have sufficient funds to enter into the transaction. It is to be appreciated that computer executable aspects of the method illustrated in FIG. 8 can be implemented in computer executable instructions that may be stored on a computer readable medium.

FIG. 9 is a flow chart of an example token/protocol distributor method for secure transactions that employ late binding tokens. Thus, the method illustrated in FIG. 9 facilitates secure, verifiable transactions involving a late binding token, where the transactions may be, for example, card not present transactions. At 900, a protocol that facilitates creating structured proposal is provided to, for example, merchants. The protocol may also be provided to token distributors to simplify interactions between late binding tokens and merchants employing the protocol. At 910, the late binding token and software associated with a late binding token are provided. The software may, for example, facilitate locating a token server associated with the late binding token. The token server associated with the late binding token may be found, for example, by retrieving a URL stored on the token. At 920, the software associated with the late binding token is distributed.

At 930, a request for additional software associated with a late binding token is received. This additional software can facilitate communications between, for example, the late binding token and the token server and/or a client side software. Thus, communications concerning verifiably secure structured proposals are facilitated. In one example, the additional software may be provided in the form of an applet. Thus at 940, the applet may be provided to the computer component requesting the additional software.

At 950, the late binding token distributed at 910 can be bound to one or more items. These items can include, but are not limited to, a customer, a merchant, a funds verification system, a credit account, a debit account, a merchant account, a frequent flyer account, and a prepaid account. Data associated with the binding can be stored, for example, on a token server which facilitates minimizing the amount of sensitive information transmitted across, for example, the Internet during electronic commerce. While binding the token is illustrated at block 950, it is to be appreciated that the binding can occur at other earlier and/or later points in time.

At 960, a bundle that has been digitally signed twice is received. This bundle can include, but is not limited to, an unsigned hash associated with a verifiably secure structured proposal, a signed hash associated with a verifiably secure structured proposal, indicia of consumer acceptance of an offer contained in the verifiably secure structured proposal, and identifiers like consumer identifiers, token identifiers, software identifiers, applet identifiers, binding identifiers, and so on.

At 970, the bundle received at 960 can be verified, which facilitates establishing a consumer intention data. In this manner, the twice signed bundle received at 960 acts as a means for determining that the intent of the consumer to enter into a transaction may be associated with the structured proposal. This consumer intention data can store a confidence level associated with determining whether a consumer desired to enter into a transaction. This confidence level can be produced by analyzing one or more items in the twice signed bundle. Since there are two digital signatures available, each digital signature can be examined when producing the confidence level. A first digital signature may indicate that the consumer indicated acceptance of the offer in a verifiably secure manner. A second digital signature may indicate that the structured proposal was presented to a consumer in a secure window in a verifiably correct manner. It is to be appreciated that the digital signatures may indicate other items that further facilitate increasing confidence in a verifiably secure transaction.

In one example, at 980, funds may be verified. For example, a determination may be made whether a consumer has adequate funds and/or credit to justify accepting the transaction. Thus, at 980, a consumer funds position related to the transaction may be produced. This position can be, for example, a binary yes/no acceptance, or a value indicating a degree of acceptance (e.g., 0-10). At 990, at least one of an acceptance and a rejection of the transaction associated with the twice signed bundle received at 960 is provided to, for example, a consumer and/or a merchant. This acceptance and/or rejection can be based, at least in part, on the consumer funds position determined at 980 and/or a security level associated with verifying the bundle at 970. It is to be appreciated that computer executable aspects of the method illustrated in FIG. 9 can be implemented in computer executable instructions and that such computer executable instructions can be stored on a computer readable medium.

Figure 10:
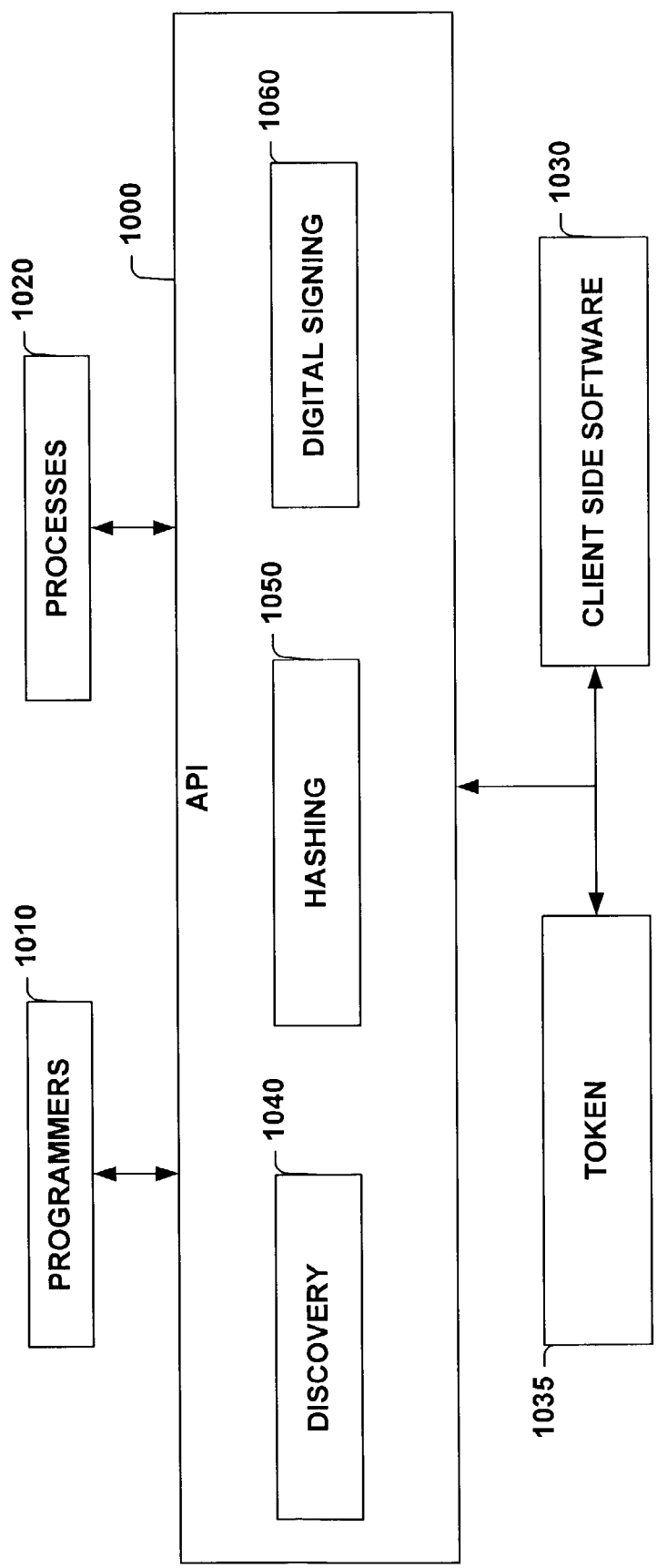
FIG. 10 illustrates an example application programming interface (API) for interfacing with late binding tokens.

Referring now to FIG. 10, an application programming interface (API) 1000 is illustrated providing access to a late binding token 1035 and/or a client side software 1030. The API 1000 can be employed, for example, by programmers 1010 and/or processes 1020 to gain access to processing performed by the token 1035 and/or client side software 1030. For example, a programmer 1010 can write a program to access a token 1035 (e.g., to invoke its operation, to monitor its operation, to access its functionality) where writing a program is facilitated by the presence of the API 1000. Thus, rather than the programmer having to understand the internals of the token 1035, the programmer's task is simplified by merely having to learn the interface to the token 1035. This facilitates encapsulating the functionality of the token 1035 while exposing that functionality. Similarly, the API 1000 can provide data values to the token 1035 and/or retrieve data values from the token 1035. For example, a process 1020 that retrieves a signed hash can provide an unsigned hash to the token 1035 and/or the client side software 1030 via the API 1000 by, for example, using a hash call provided in the API 1000. Thus, in one example of the API 1000, a set of application program interfaces can be stored on a computer-readable medium. The interfaces can be executed by a computer component in conjunction with a client software and/or late binding token. The interfaces include a first interface for discovering a late binding token associated with the client software and a second interface for hashing a first data. The first data is provided to the late binding token by the client software. The interfaces also include a third interface for digitally signing a second data received by the client software from the late binding token, where the second data is derived, at least in part, from the first data.

Figure 11:
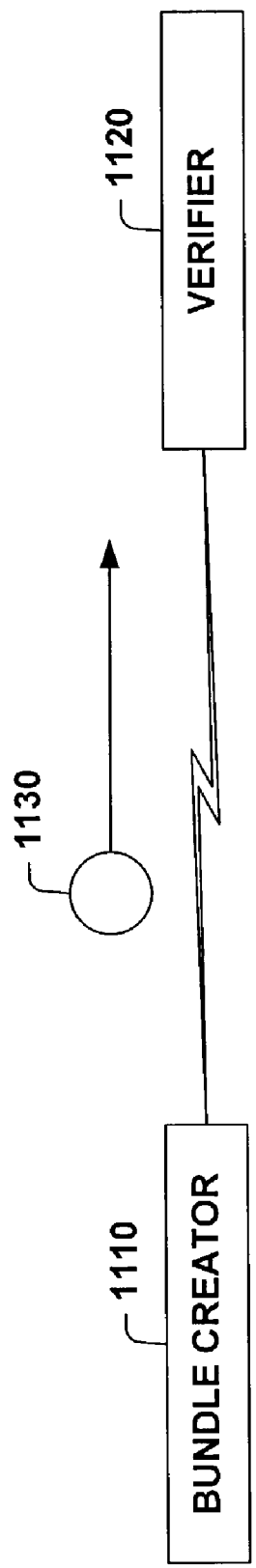
FIG. 11 illustrates an example twice signed bundle employed with secure transactions utilizing late binding tokens.

FIG. 11 illustrates an example twice signed bundle 1130 being transmitted between a bundle creator 1110 and a verifier 1120. The twice signed bundle 1130 is an example of a computer data signal that may be embodied in a transmission medium. The bundle 1130 can include an unsigned hash of a structured proposal, an indicia of consumer acceptance of an offer in the structured proposal, a digitally signed hash of the structured proposal, the indicia of consumer acceptance, and one or more identifiers associated with entities including, but not limited to, the provider of the structured proposal, a late binding token employed by the consumer, and a client software that presented the offer contained in the structured proposal to the consumer. The bundle 1130 may also include a second digital signature affixed to the bundle 1130. This second digital signature can be provided, for example, by client software that displayed the structured proposal to the consumer. Similarly, the bundle 1130 can include a first digital signature on the digitally signed hash. This first digital signature can be provided, for example, by a late binding token.

The systems, methods, and so on described herein may be stored, for example, on a computer readable media. Media can include, but are not limited to, an application specific integrated circuit (ASIC), a compact disc (CD), a digital versatile disk (DVD), a random access memory (RAM), a read only memory (ROM), a programmable read only memory (PROM), a disk, a carrier wave, a memory stick, and the like.

Thus, an example computer readable medium can store computer executable instructions for a method for securely indicating verifiable consumer intent to enter into a transaction. The method includes receiving an unbound token (e.g., a smart card), and receiving a first software associated with the unbound token. The first software facilitates locating a token server associated with the unbound token, where the token server stores logic that facilitates interacting with the token. The method also includes receiving a second software from the token server, where the second software facilitates interacting with the unbound token.

Another example computer readable medium can store computer executable instructions for a method for securely transmitting a verifiable merchant intent to enter into a transaction. The method includes receiving a structured proposal protocol that identifies how to format an offer in a verifiably secure manner. The method also includes creating a structured proposal according to the protocol, where the structured proposal comprises an offer to enter into a transaction, and providing the structured proposal to a consumer. The method further includes receiving a response to the offer comprising one of, an authorized acceptance of the offer, a rejection of the offer, and an unauthorized acceptance of the offer, and selectively completing the transaction based, at least in part, on the response.

Another example computer readable medium stores computer executable instructions for a method for facilitating secure, verifiable transactions involving a late binding token. The method includes providing a protocol for making a verifiably secure structured proposal, to, for example, merchants. The method also includes providing a late binding token and a first software associated with the late binding token to, for example, consumers, where the first software facilitates locating a token server associated with the late binding token. The method further includes receiving a request for a second software associated with the late binding token, from, for example, a consumer. The second software facilitates communication between the late binding token and the token server concerning a verifiably secure structured proposal. Finally, the method includes providing the second software, to, for example, the consumer.

Similarly, an example computer readable medium can store computer executable components of a late binding token system. The system includes a client software for communicating with at least one of a late binding token, a merchant application, a token server, and a verifier. The system also includes a token that is initially unbound and that can be bound after receipt by a consumer, and a protocol that specifies parameters associated with a structured proposal that will be processed by the client software.

Figure 12:
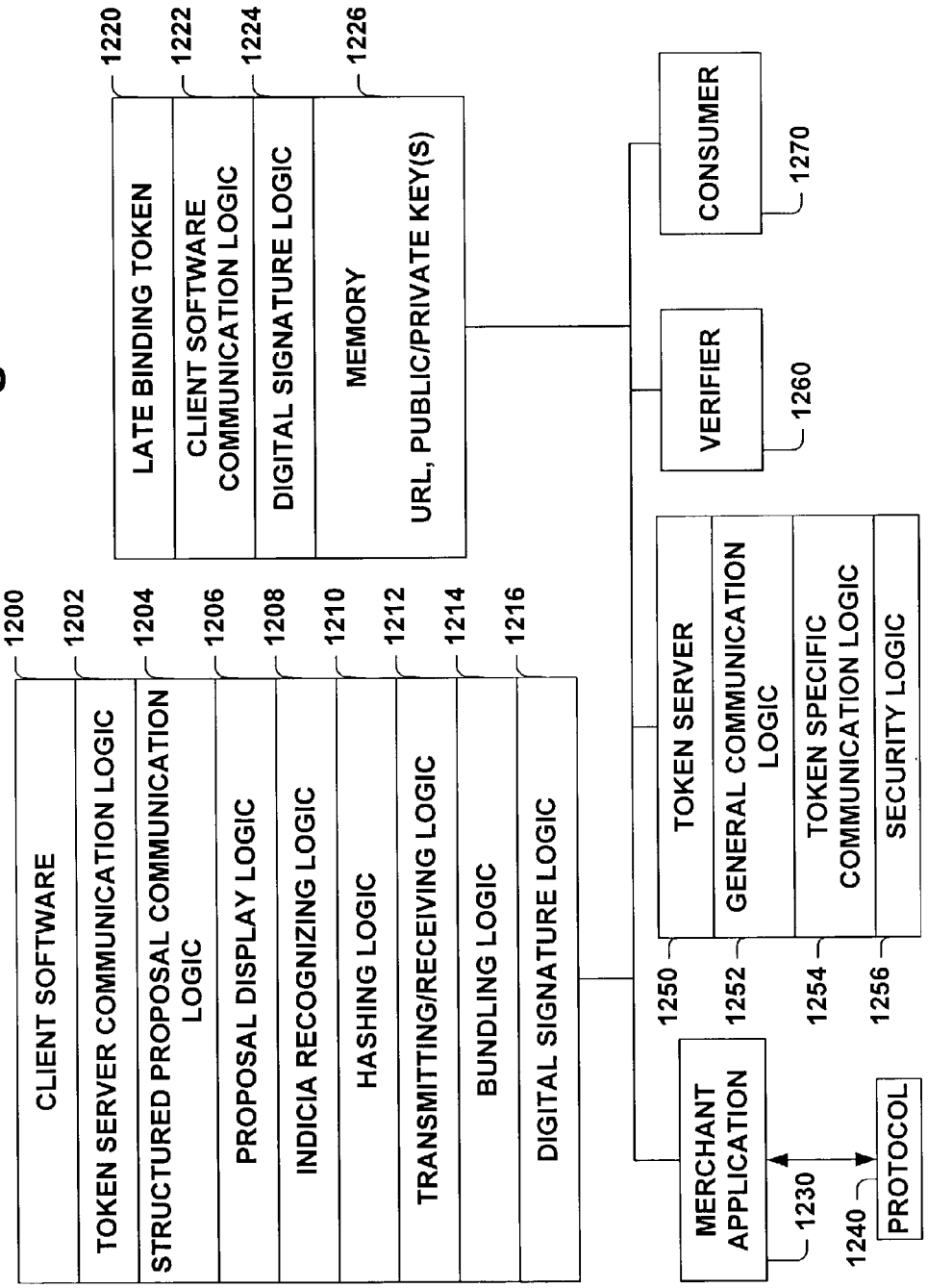
FIG. 12 illustrates an example late binding token system.

FIG. 12 illustrates an example late binding token system. A client software 1200 includes a number of logics that facilitate interacting with entities like a late binding token 1220, a merchant application 1230, a token server 1250, a verifier 1260, and/or a consumer 1270. While the client software 1200 is illustrated having eight separate logics, it is to be appreciated that these logics may be arranged in a greater and/or lesser number of logics. Similarly, while the late binding token 1220 is illustrated having two separate logics and a memory 1226, that the logics may be combined in a greater and/or lesser number of logics.

A token server communication logic 1202 facilitates interacting with a token server 1250. For example, the token server communication logic 1202 may be programmed to optimize data transfers between the token server 1250 and the client software 1200. The structured proposal communication logic 1204 facilitates communicating structured proposals with the merchant application 1230 and/or a consumer 1270 via a secure window (not illustrated). Similarly, the proposal display logic 1206 facilitates displaying a structured proposal received from a merchant application 1230 to the consumer 1270 in a secure window (not illustrated). Once the offer in a structured proposal has been presented to the consumer 1270, the client software 1200 may attempt to determine whether the consumer 1270 has accepted the offer. Thus, the client software 1200 includes indicia recognizing logic 1208 that facilitates determining whether the consumer 1270 has provided indicia of acceptance including, but not limited to, pressing "I agree" buttons, providing a personal identification number, and so on.

The client software 1200 includes hashing logic 1210 that can hash the structured proposal, the indicia of acceptance, and other related items and provide them to, for example, the late binding token 1220. The late binding token 1220 includes client software communication logic 1222 that facilitates communicating with the client software 1200. The late binding token 1220 also includes digital signature logic 1224 that can sign items received from the client software 1200 (e.g., the hash), and return them to the client software 1200.

The client software 1200 therefore includes transmitting/receiving logic 1212 to transmit unsigned hashes to the late binding token 1220 and to receive signed hashes from the late binding token 1220.

The client software 1200 also includes bundling logic 1214 that facilitates bundling up, for example, an unsigned hash, indicia of acceptance, and a signed hash received from the late binding token 1220. The client software 1200 also includes digital signature logic 1216 that can be employed, for example, to sign a bundle produced by the bundling logic 1214. This digitally signed bundle can be provided to, for example, a verifier 1260 that can determine a security assurance level for the bundle and/or for the transaction as a whole.

FIG. 12 also illustrates a token server 1250 that includes three logics. Again, it is to be appreciated that the logics in the token server 1250 can be arranged in a greater and/or lesser number of logics. The token server 1250 includes a general communication logic 1252 that facilitates communicating with computer components including, but not limited to, a merchant application 1230, the client software 1200, the late binding token 1220, a verifier 1260, and/or a consumer 1270. The token server 1250 also includes a token specific communication logic 1254 that facilitates communicating with a certain class of late binding tokens 1220. This token specific communication logic 1254 can be downloaded to the client software 1200 to simplify communications between the client software 1200 and the late binding token 1220. The token specific communication logic 1254 may be customized depending, for example, on the capabilities of the token or the types of transactions into which the consumer 1270 desires to enter. The token server 1250 also includes security logic 1256 that facilitates determining the integrity of messages to which one or more digital signatures have been affixed.

FIG. 12 also illustrates a merchant application 1230 related to a protocol 1240. The protocol 1240 specifies what a structured proposal produced by the merchant application 1230 should include. Thus, the merchant application 1230 can produce a structured proposal that can be processed by the client software 1200 and/or the late binding token 1220 to improve transactions into which the consumer 1270 desires to enter.

What has been described above includes several examples. It is, of course, not possible to describe every conceivable combination of components or methodologies for purposes of describing the methods, systems, computer readable media and so on employed in late binding token systems. However, one of ordinary skill in the art may recognize that further combinations and permutations are possible. Accordingly, this application is intended to embrace alterations, modifications, and variations that fall within the scope of the appended claims. Furthermore, to the extent that the term "includes" is employed in the detailed description or the claims, it is intended to be inclusive in a manner similar to the term "comprising" as that term is interpreted when employed as a transitional word in a claim.

What is claimed is:

1. A late binding token system, comprising:
   a token server of an issuer, the token server communicating with a network;
   a merchant server communicating with the network;
   an account server, storing information for a consumer, communicating with the network;
   a physical late binding token, from the issuer, including a locator code initially binding the late binding token to only the token server when the consumer receives the physical late binding token, and including a memory for storing a public/private key pair;
   a client software communicating with the late binding token server and at least one of the merchant server and the account server for verifying the bindings of the physical late binding token with the token server, the merchant server and the account server, the consumer communicating with at least one of the merchant server and the account server via the client software to perform a transaction;
   first software associated with the late binding token and executable by said client software for retrieving said locator code from said physical late binding token for establishing communication between said client software and the token server via the network, the first software verifying the physical late binding token to the token server; and
   second software, provided to said client software via the network, for binding the consumer to the account server, for transactions between the client software, the merchant server, the account server, the late binding token, and the token server;
   wherein the second software binds the token to the account server only after the first software verifies the late binding token with the token server; and
   wherein if the token server has previously verified the late binding token and if the late binding token has been previously bound to the account server, the token server requests payment from the account server to the merchant server while only disclosing selected information of the consumer to the merchant server.

2. The system of claim 1, where the client software comprises:
   a first logic for receiving a token server communication logic;
   a second logic for receiving a structured proposal to present to a consumer;
   a third logic for securely displaying the structured proposal to the consumer;
   a fourth logic for recognizing an indicia of consumer acceptance of an offer in a displayed structured proposal;
   a fifth logic for hashing a structured proposal and an indicia of consumer acceptance into an unsigned hash to transmit to the late binding token; and
   a sixth logic for providing an unsigned hash to the late binding token and receiving a signed hash from the token.

3. The system of claim 2, comprising:
   a seventh logic for bundling one or more of an unsigned hash, an indicia of consumer acceptance, a signed hash, a late binding token identifier, and a client software identifier into a bundle; and
   an eighth logic for digitally signing a bundle.

4. The system of claim 1, where the late binding token comprises:
   a first token logic for communicating with the client software;
   a second token logic for digitally signing an unsigned hash received from the client software; and
   wherein the memory stores at least one of, a token server URL, and the public/private key pair.

5. The system of claim 1, where the token server comprises:
one or more token server communication logics associated with one or more late binding token types; and
a first token server logic for selectively transmitting one or more token server communication logics to a client software in response to a download request from the client software.

6. The system of claim 5, comprising:
a second token server logic for receiving a digitally signed bundle from the client software; and
a third token server logic for determining a security assurance level of the digitally signed bundle.

7. The system of claim 1, comprising:
a structured proposal protocol that specifies at least one of, the format of a structured proposal, the content of a structured proposal, the size of a structured proposal, fields required for a structured proposal, an encryption technique for encrypting a structured proposal, and a structured proposal schema.

8. The system of claim 7, comprising a structured proposal generator that compiles a merchant offer into a structured proposal that can be received by the client software.

9. The system of claim 7, where a structured proposal comprises a digital merchant trademark.

10. The system of claim 1, comprising a verifier for determining a security assurance level of a digitally signed bundle.

11. The system of claim 10, the verifier comprising a first verifier logic for determining whether a consumer has sufficient funds to complete a transaction associated with the digitally signed bundle.

12. A method for securely indicating verifiable consumer intent to enter into a transaction, comprising:
receiving a physical late binding token of an issuer, the late binding token including a memory for storing a public/private key pair communicating with a network and including a locator code initially binding the late binding token to only an associated token server of the issuer when a consumer receives the late binding token;
verifying the bindings of the physical late binding token via a client software communicating with the token server and at least one of a merchant server, a consumer, an account server storing information for the consumer, and the late binding token;
communicating with the merchant server via the client software to perform a consumer transaction;
executing a first software, associated with the late binding token, for retrieving the locator code from the late binding token for establishing a communication link between the physical late binding token and the token server, via the network, initially binding the physical late binding token to the token server, and verifying the late binding token to the token server;
providing a second software to the client software via the network, for binding the consumer to the account server for transactions between the client software, the merchant server, the account server, the late binding token, and the token server, to create respective bindings between the late binding token and at least one of the consumer and the account server;
verifying that the offering from the merchant was correctly displayed to the user via the second software, only after the first software verifies the late binding token with the token server; and
if the display of the offering from the merchant was successfully verified, verifying that the input from the user was correctly communicated to at least one of the merchant server or the account server while only disclosing selected information of the consumer to the merchant.

13. The method of claim 12, where the transaction is a card not present transaction.

14. The method of claim 12, comprising:
receiving a structured proposal that comprises an offer to enter into a transaction;
displaying the structured proposal to a consumer, where the structured proposal is displayed in a secure window; and
determining whether the consumer accepts the offer.

15. The method of claim 12, comprising:
binding the late binding token to one or more items to make a bound token.

16. The method of claim 15, where the items include at least one of, a credit account, a debit account, a merchant account, a frequent flyer account; and a prepaid account.

17. The method of claim 15, comprising:
hashing a structured proposal and an indicia of consumer acceptance of an offer into an unsigned hash;
providing the unsigned hash to the token; and
receiving a digitally signed hash from the token.

18. The method of claim 17, comprising:
bundling the unsigned hash, the digitally signed hash, and one or more identifiers associated with at least one of, the token, and the second software into a bundle;
digitally signing the bundle; and
providing the signed bundle to a bundle verifier.

19. The system of claim 1, wherein the merchant server communicates with the token server for requesting payment authorization from the account server to complete the transaction.

20. The method of claim 12, further including:
transmitting a payment request from the merchant server to the token server for requesting payment authorization from the account server to complete the transaction.

21. The system of claim 1, wherein the second software binds the token to the account without altering the token.

* * * * *